June 15, 1954
F. NIESEMANN
2,681,257
METER BEARING AND SEAL
Filed Sept. 30, 1950
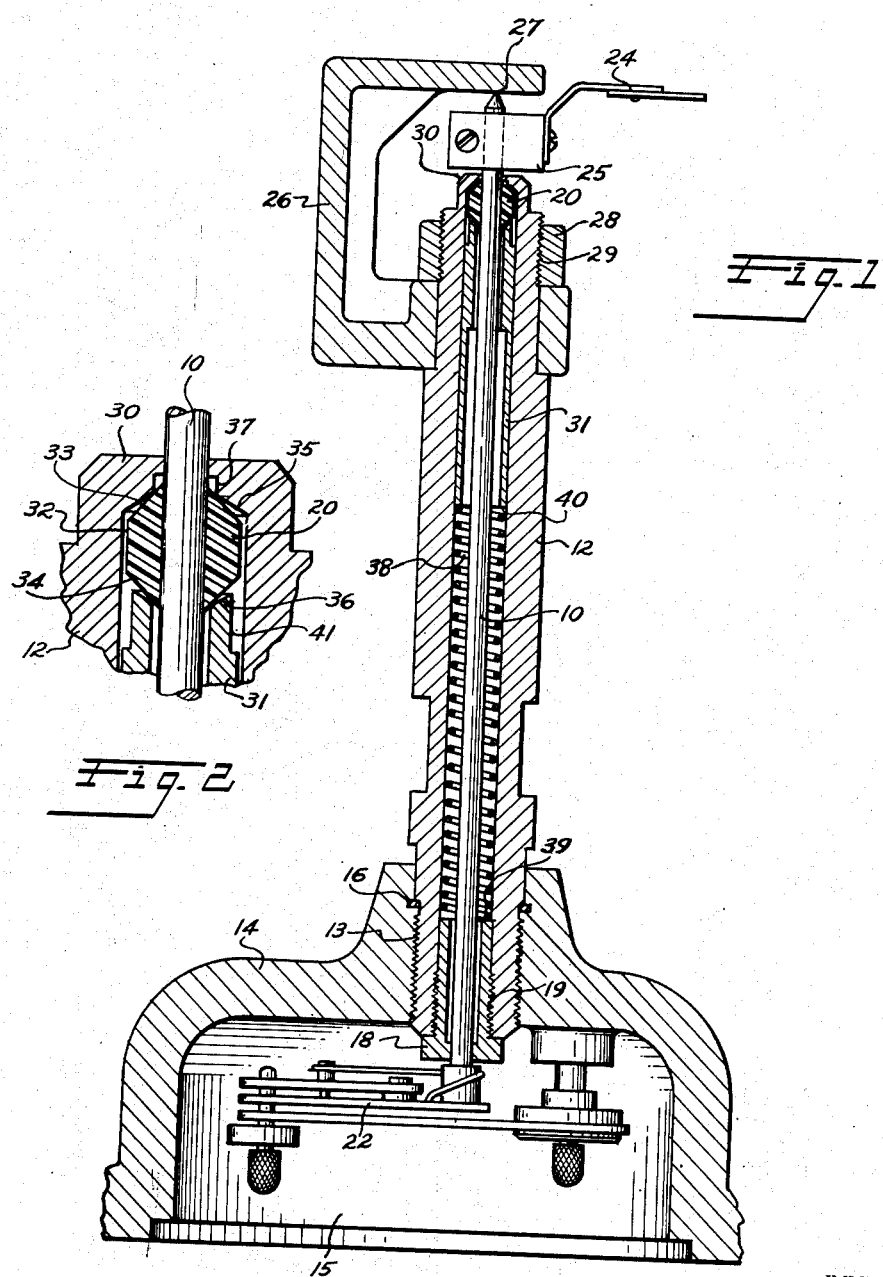
INVENTOR
FRITZ NIESEMANN
BY Strauch, Nolan & Diggins
ATTORNEYS Patented June 15, 1954

2,681,257

UNITED STATES PATENT OFFICE 2,681,257

METER BEARING AND SEAL

Fritz Niesemann, Pittsburgh, Pa., assignor to Rockwell Manufacturing Company, Pittsburgh, Pa., a corporation of Pennsylvania Application September 30, 1950, Serial No. 187,787

15 Claims. (Cl. 308—36.2)

This invention relates to new and useful improvements in meters used for measurements of gases or other fluids under pressure, and more particularly to improvements in shaft mounting means for such meters. A preferred embodiment of this invention is disclosed as an improvement of orifice meters of the general type disclosed in United States Patent No. 2,024,059, issued December 10, 1935, to Walter H. Parker et al.

In the usual type of orifice meter, of which that disclosed in the Parker et al. patent is a typical example, there is a restriction in a conduit through which the fluid passes. Pipe connections extend from the high and low pressure sides of said restriction to high and low pressure chambers of the meter respectively, and the chambers are joined by a U-tube containing a liquid such as mercury. One of said chambers has a float therein, the movement of which indicates the differential pressure and therefore the flow of the fluid through the conduit. The float is usually connected by a lever to one end of a scriber shaft. The other end of the scriber shaft is fixed, as by an arm, to a scribing device such as a pen or other indicator, whereby said arm is pivoted about the axis of the shaft in response to vertical movement of the float. In a meter of this type, it is necessary to provide a leakage resistant bearing or stuffing box for the scriber shaft to prevent leakage of the gases or other fluids through the scriber shaft bearing due to the difference in pressure between the float chamber and the atmosphere.

It is a primary object of this invention to provide a new and improved bearing for shafts of meters which prevents leakage of fluid or gas from a chamber containing fluid or gas under pressure to the atmosphere without unduly inhibiting the rotation of the shaft.

A further object of the invention is to provide an improved leakage resistant, low friction bearing for a scriber shaft of orifice meters whereby such meters are operable with a much higher pressure differential between the atmosphere and the float chamber than was heretofore possible.

In prior art leakage resistance bearings for rotatable meter shafts, the leakage resistance of the bearing and the friction tending to inhibit shaft rotation both varied with the operating temperature resulting in inaccuracies in indication and leakage of the fluid. An important object of this invention is to overcome these difficulties by providing a novel self-centering leakage resistant shaft bearing neither the leakage resistance nor the friction of which varies throughout the operating temperature range.

A further disadvantage of prior art leakage resistant bearings for meter shafts is that coaxial alignment of the shaft with the bore is quite critical because misalignment due to deflection or bending of the shaft will result in increased friction tending to inhibit rotation of the shaft and in decreased leakage resistance. It is accordingly a further important object of this invention to provide a leakage resistant bearing of an improved construction wherein coaxial alignment of the shaft with the housing bore is no longer critical.

More specifically, an important object of this invention is to provide a novel bearing structure in which an internal frusto-conical surface having one edge forming a bearing surface is formed within the housing coaxial with the bore, a pressure deformable toroidally shaped plastic body, which has an external frusto-conical surface adjacent and forced against the bearing edge of the conical surface of the housing, is mounted on the shaft, and in which the apex angle of the external conical surface is smaller than that of the internal conical surface so that if the axis of the external conical surface shifts relative to that of the external conical surface, the surface of the plastic body will be deformed sufficiently to conform to the bearing edge on the housing to maintain a leakage resistant seal at the bearing surface.

Other objects of this invention will become apparent as the description proceeds in connection with the accompanying drawings wherein:

Figure 1 is a horizontal section through the center of the scriber shaft and support assembly.

Figure 2 is an enlarged view of the novel bearing structure.

Referring to Figure 1, a scriber shaft 10 is rotatably mounted within and coaxial with the bore of an elongated tubular, relatively stationary, stainless steel housing 12. The hollow tubular housing 12 is threadedly connected at 13 to a float chamber casing 14 and extends through a hole in that casing into a float chamber 15. A suitable copper gasket 16 is clamped between opposed shoulders on casing 14 and housing 12 to prevent leakage of fluid through the threaded connection between them.

The scriber shaft 10 is rotatably supported within the hollow tubular housing 12 at its float chamber end by an end bearing 18, which is threadedly connected at 19 within the end of the bore of hollow tubular housing 12, and at its opposite end by a body of solid plastic packing material 20. A lever 22, forming a part of a conventional connecting linkage between the float (not shown) and the scriber shaft 10, is fixed to the float chamber end of the scriber shaft 10 which extends through end bearing 18 to the interior of the float chamber 15. Reference is made to said Parker et al. patent for any further details of such float and linkage structure necessary to understand the invention. Scriber arm 24, to which a scribing device such as a pen (not shown) is attached, is mounted on the opposite end of scriber shaft 10 by any suitable means such as by block 25. A U-bracket 26, serving at 27 as a thrust bearing for the scriber shaft 10, is rigidly mounted on the exterior of the hollow tubular housing 12 by any suitable means such as nut 28 threadedly connected as at 29 to the hollow tubular housing 12.

The bore of the hollow tubular housing 12 is considerably greater in diameter than the diameter of the scriber shaft 10 throughout the major portion of its length, but at the scriber arm end 30 the bore is reduced in diameter until it is only slightly larger than that of the scriber shaft 10. The body of plastic packing material 20 surrounds scriber shaft 10 and is longitudinally positioned thereon between end 30 of housing 12 and a sleeve member 31, which is mounted for free longitudinal movement within the tubular housing 12. Scriber shaft 10 extends through the relatively large bore of sleeve member 31, being supported by bearing 18 and body 20 as previously stated.

As is best shown in Figure 2, the body of plastic material 20 is toroidal in shape, having an external cylindrical surface 32 and oppositely inclined conical external end surfaces 33 and 34. A suitable apex angle for these conical surfaces has been found to be approximately 90°. The diameter of the cylindrical surface 32 is sufficiently smaller than that of the bore of housing 12 to allow for radial expansion of the plastic body throughout the operating temperature range without surface contact between cylindrical surface 32 and the bore of housing 12. A clearance of .0125 inch has been found to be satisfactory for the presently contemplated temperature range and for the particular plastic used.

Truncated annular conical surfaces 35 and 36 are formed within the scriber arm end 30 of housing 12 and within the adjacent end of sleeve 31 respectively. These conical surfaces are preferably equally and oppositely inclined and have apex angles larger than those of conical surfaces 33 and 34, apex angles of 118° having been found to be suitable. Plastic body 20 which is a toroidal bearing element contacts housing 12 along the circular intersection of conical surface 35 and the cylindrical bore 37 which is coaxial with the main bore of the housing 12, and contacts sleeve 31 along the circular intersection of the core of sleeve 31 with the conical surface 36 thereof. By this construction, the area of contact between body 20 and stationary housing 12 and sleeve 31 is reduced to a minimum, there being substantially line contact between body 20 and sleeve 31 and housing 12.

A coil type compression spring 38 is mounted in compressed condition within the bore of the tubular housing 12 with one end abutting against a stop, which as disclosed is the end 39 of bearing 18, and its other end abutting against the inner end 40 of sleeve member 31. The body of plastic packing material 20 is thus maintained under constant pressure between the bearing edges of the two conical surfaces 35 and 36.

The conical surfaces 33 and 34 of body 20 in cooperation with the mating conical surfaces 35 and 36 on the bore of housing 12 and on the end of sleeve 31 form a self-centering bearing for the shaft 10. There is no appreciable increase in bearing pressure as the plastic body 20 expands with an increase in temperature because clearance has been provided to permit radial expansion of body 20 without contacting the bore of housing 12, because sleeve 31 is movable within the bore to permit longitudinal expansion of body 20, and because the conical surfaces 33 and 34 can shift relative to the edges of surfaces 35 and 36 to permit radial expansion of the conical ends of body 20. It will be noted that in this improved bearing structure, the leakage resistance and the friction of the bearing will remain constant throughout the temperature range. This applied pressure tends to wedge plastic body 20 firmly against the shaft 10 to form a tight seal and to form a leakage resistant bearing for shaft 10 between plastic body 20 and housing 12. It should be noted that in this construction neither the friction at the bearing nor the leakage resistance of the bearing will be changed substantially if the axis of the shaft should not be exactly coaxial with that of the bore of housing 12. If the shaft 10 should be slightly bent for example, the axes of conical surfaces 33 and 34 will be shifted slightly relative to the axes of conical surfaces 35 and 36 respectively, but plastic body 20 being slightly deformable under pressure, surfaces 33 and 34 will be conformed at their respective lines of contact with surfaces 35 and 36 to the circular bearing areas thereof. In this manner the leakage resistance of the seal between plastic body 20 and housing 12 will not be decreased and the friction at the bearing will not be increased substantially. The outside of the end of sleeve 31 adjacent surface 36 is reduced to provide an annular recess 41 between the sleeve 31 and the housing bore to aid the self aligning action of plastic body 20 relative thereto.

From the foregoing description it is seen that the plastic packing material body 20 for the scriber shaft according to the invention must be chemically inert to the metals with which it comes into contact, and to the fluids, the flow of which is being measured. It must be hard but capable of being deformed slightly at operating temperature and under pressure to conform by cold flow to the bearing surfaces without substantial radial expansion due to that pressure. The packing material should be non-water absorbent, and should have a minimum coefficient of friction even when subjected to considerable bearing surface pressure and without lubrication. Of the solid, pressure deformable plastics available the ethylene polymers have been found to meet these requirements very well, and the tetrafluoro ethylene polymers have been found exceptionally suitable for this purpose. The tetrafluoro ethylene polymers have the following chemical analysis:

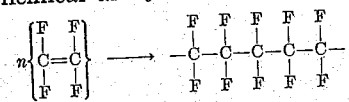

A tetrafluoro ethylene polymer known commercially as "Teflon" is a waxy gray-white material that is now preferred for the commercial embodiment of this invention. It is of comparatively light weight, homogeneous, high tensile strength and inert up to 400° F. to 500° F.

The solid tetrafluoro ethylene polymer body 20, when subjected to the constant pressure of spring 38 at operating temperatures, will conform snugly to the surface of the scriber shaft 10 and to the contacted portions of surfaces 35 and 36 to form a tight seal which prevents the leakage of gases or other fluids past the plastic body 20 without inhibiting rotation of shaft 10. It is chemically inert with respect to the metals with which it comes into contact, as well as with gases, organic solvents and other fluids to which it may be subjected in a meter of this type, and it provides a very low friction bearing, which requires no lubrication, for the shaft. Therefore, a shaft bearing has been devised according to the invention which provides a much better seal against leakage of gases or other fluids along the shaft due to the pressure differential between the atmosphere and the pressure chamber than heretofore available. It has little or no tendency to inhibit rotation of the scriber shaft in response to motion of the float even if the shaft is slightly bent. No lubrication is necessary and the body of solid synthetic plastic conforms so closely to the shaft and the contacted portions of surfaces 35 and 36 that there is no fluid leakage either between shaft 10 and body 20 or between body 20 and edge of surface 35 even if the shaft is slightly bent.

Since the invention may be embodied in other specific forms or applied to meters other than of the type of the illustrated embodiment without departing from the spirit or essential characteristics thereof, the present embodiment is to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a meter, an improved leakage resistant shaft bearing assembly comprising an elongated housing having a longitudinal bore therethrough, a rotatable shaft smaller in diameter than said bore and extending through said bore, a torodially shaped body on said shaft having an outer diameter sufficiently smaller than the diameter of said bore to permit expansion of said body throughout the operating temperature range thereof without contacting said bore, means within said bore defining a fixed annular edge, said body being a hard, solid plastic body formed of an ethylene polymer which may undergo slight deformation under pressure to conform itself to said annular edge and to said shaft, and means within said bore for pressing said body against said edge and said shaft to form a leakage resistant self-centering bearing for said shaft.

2. In the meter defined in claim 1, the material of said hard, solid plastic ethylene polymer body being a tetrafluoro ethylene polymer.

3. In a meter having a differential pressure responsive element within a pressure chamber, external indicating means, a shaft extending into said pressure chamber through an opening therein to operatively connect the pressure responsive element and the indicating means, a hollow housing secured at one end with said opening by a fluid tight connection, said shaft extending through the bore of the hollow housing and being mounted for rotation therein, and means within said hollow housing for preventing leakage of fluid from said pressure chamber along said shaft, said leakage preventing means comprising a toroidally shaped body having its outer diameter sufficiently smaller than the diameter of said housing bore to permit expansion of said body throughout the operating temperature range thereof without contacting said bore, said body being a solid plastic body that may undergo slight deformation under pressure, means within said housing bore defining a fixed annular edge, and means acting substantially coaxially with said shaft for exerting pressure on said body to conform it slightly to the contacted annular edge within said bore and to conform it in fluid tight relation with said shaft whereby said body coacts with said fixed annular edge and with said shaft to provide a low friction leakage resistance bearing for said shaft.

4. In a meter, a housing having an elongated bore of substantially constant diameter over a major portion of its length, apertured fixed abutments within said bore adjacent opposite ends thereof, a scriber shaft rotatable within said bore and extending through the apertures of said abutments, and means in said bore providing a fluid tight seal between said shaft and said housing comprising a toroidal body of deformable solid plastic material surrounding and conformed to said shaft and contacting one of said abutments along an annular edge thereof, a sleeve surrounding said shaft slidable along said shaft with one end formed with an annular edge engaging said body, and a compression spring surrounding said shaft extending between said other abutment and said sleeve.

5. In a meter, a housing having an elongated bore therein of substantially constant diameter over a major part of its length, means forming an annular rigid inwardly facing shoulder at one end of said bore, a rotatable shaft extending through said bore and emerging through said shoulder defining means at one end of the bore, and means within said bore defining a low friction bearing for said shaft and a fluid tight seal between the shaft and housing comprising a body of solid plastic material received in fluid tight relation upon said shaft and means within said bore urging said body axially of said bore against said shoulder with substantially constant pressure, the contacting faces of said body and shoulder being of such configuration that annular line fluid tight contact is established therebetween, said shoulder comprising a generally frustoconical surface that is smallest toward the adjacent end of said bore.

6. In the meter defined in claim 5, said shoulder comprising an internal frusto-conical surface having a predetermined apex angle and the adjacent end of said plastic body having an external frusto-conical surface having an apex angle smaller than said predetermined apex angle whereby substantially annular line contact is established between said body and shoulder.

7. In the meter defined in claim 5, said means urging the body against said shoulder comprising a sleeve slidable within the bore and having a substantially frusto-conical end face in annular line contact with said body, and an axially acting compression spring in said bore whereby substantially annular line contact is established between said sleeve and said body.

8. In the meter defined in claim 5, said means for urging the body against said shoulder comprising a sleeve slidable longitudinally in said bore and having an annular face substantially centered between the shaft and bore resiliently urged into annular line contact with said body.

9. In a meter, an apertured housing, a shaft projecting outwardly of said housing through the aperture thereof, self-centering anti-friction bearing structure for said shaft comprising a fixed abutment having an annular edge surrounding said shaft within said housing inwardly of said aperture, a second abutment having a second annular edge surrounding said shaft and mounted for translatory movement axially of said shaft, a toroidal body formed of an anti-friction plastic surrounding, journalling and conformed in fluid tight relation to said shaft between said abutments, and means for resiliently biasing said movable abutment, toroidal body, and fixed abutment into fluid tight contact along said annular edges.

10. In a meter, a sealed housing having an aperture formed through a wall thereof, a rotatable shaft projecting outwardly from said housing through said aperture, a self-centering bearing for said shaft comprising a pair of abutments within said housing around said shaft each being apertured substantially coaxial with said shaft, the opposed faces of said abutments being concave in form and terminating inwardly in annular edges, a toroidal body formed of a hard plastic slightly deformable under pressure, said body surrounding, journalling and being conformed in fluid tight relation with said shaft between said abutments, one of said abutments being fixed in fluid tight relation with said housing and the other resiliently biased toward said fixed abutment against said toroidal body, the end faces of said toroidal body being of such convex form as to contact said abutments only along said inner annular edges whereby line contact is established therebetween and fluid leakage through said bearing is prevented.

11. In a meter, a sealed housing having an aperture formed through a wall thereof, a rotatable shaft projecting from said housing, a self-centering fluid tight bearing for said shaft comprising a pair of abutments within said housing around said shaft having apertures substantially coaxial with said shaft, the opposed faces of said abutments being concave in form and terminating inwardly in annular edges surrounding and spaced from said shaft, a toroidal body surrounding, journalling, and conformed in fluid tight relation to said shaft between said abutments, one of said abutments being fixed in fluid tight relation with said housing and the other resiliently biased toward said fixed abutment against said toroidal body, the end faces of said toroidal body being of such form as to contact said abutments along said edges only and said toroidal body being formed of a hard low friction plastic slightly conformable under pressure to the contacted portions of said abutments and to said shaft to form a fluid tight bearing for said shaft.

12. In a meter, a sealed housing formed with an aperture through a wall thereof, a shaft projecting outwardly from said housing through said aperture, an abutment surrounding said shaft inwardly of said aperture and formed with an annular edge, a toroidal body formed of an ethylene polymer subject to slight cold flow under pressure, said body being disposed on said shaft in fluid tight relation therewith inwardly of said edge and having a convex surface adjacent said edge, and means resiliently biasing said toroidal body toward said abutment so that the convex surface thereof contacts said abutment along said edge only and providing a fluid tight low friction bearing for said shaft.

13. In a meter, a sealed housing formed with a longitudinal bore terminating in an end aperture; a shaft projecting outwardly from said housing through said bore and aperture; an abutment surrounding said shaft within said bore inwardly of said aperture and formed with an inner annular edge; a toroidal body having an outside diameter sufficiently smaller than the diameter of said bore to permit expansion thereof over its normal operating range without contacting the wall of said bore and substantially larger than that of said edge, said toroidal body being formed of an ethylene polymer, subject to slight cold flow under pressure, being mounted on said shaft in fluid tight relation therewith inwardly of said edge and having a convex face adjacent said edge; and means resiliently biasing said toroidal body toward said abutment so that the convex surface thereof contacts said abutment along said edge only.

14. In a meter, a sealed housing formed with an aperture through a wall thereof, a shaft projecting outwardly from said housing through said aperture, an abutment surrounding said shaft inwardly of said aperture and formed with an annular edge, a toroidal body of a tetrafluoroethylene polymer subject to slight cold flow under pressure, said body being disposed in surrounding fluid tight relation to said shaft inwardly of said edge and having a convex surface adjacent said edge, and means resiliently biasing said toroidal body toward said abutment so that the convex surface thereof contacts said abutment along said edge only thereby providing a fluid tight low friction bearing for said shaft.

15. In a meter, a sealed housing formed with a longitudinal bore terminating in an end aperture; a shaft projecting outwardly from said housing through said bore and aperture; an abutment surrounding said shaft within said bore inwardly of said aperture and formed with an inner annular edge; a toroidal body having an outside diameter sufficiently smaller than the diameter of said bore to permit expansion thereof over its normal operating range without contacting the wall of said bore and substantially larger than that of said edge, said toroidal body being formed of a tetrafluoroethylene polymer subject to slight cold flow under pressure, being mounted on said shaft in fluid tight relation therewith inwardly of said edge and having a convex face adjacent said edge; and means resiliently biasing said toroidal body toward said abutment so that the convex surface thereof contacts said abutment along said edge only.

References Cited in the file of this patent

UNITED STATES PATENTS

| Number | Name | Date |
|---|---|---|
| 275,193 | Grannan | Apr. 3, 1883 |
| 412,874 | Chaddack | Oct. 15, 1889 |
| 1,494,169 | Johnson | May 13, 1924 |
| 1,923,291 | Zimmerer | Aug. 22, 1933 |
| 1,997,069 | More et al. | Apr. 9, 1935 |
| 2,024,059 | Parker et al. | Dec. 10, 1935 |
| 2,129,069 | Roberts | Sept. 6, 1938 |
| 2,199,880 | Elliott | May 7, 1940 |
| 2,260,820 | Barr | Oct. 28, 1941 |
| 2,467,312 | Jack | Apr. 12, 1949 |